United States Patent [19]
Pipitone et al.

[11] 3,969,592
[45] July 13, 1976

[54] PUSHBUTTON-CONTROLLED CALL-NUMBER SELECTOR FOR DIAL-EQUIPPED TELEPHONE

[75] Inventors: Roberto Pipitone; Vittorio Montesi, both of Milan, Italy

[73] Assignee: Societa Italiana Telecomunicazioni Siemens S.p.A., Milan, Italy

[22] Filed: Jan. 2, 1974

[21] Appl. No.: 429,909

[30] Foreign Application Priority Data
Jan. 3, 1973  Italy .................................... 19009/73

[52] U.S. Cl. ............................. 179/90 K; 340/365 E
[51] Int. Cl.² ..................................... H04M 1/44
[58] Field of Search ............ 179/90 K, 90 B, 90 BB, 179/90 R, 90 CS; 340/365 E

[56] References Cited
UNITED STATES PATENTS

| | | | |
|---|---|---|---|
| 3,488,451 | 1/1970 | Nenninger et al. ................ | 179/90 K |
| 3,601,552 | 8/1971 | Barnaby et al. .................... | 179/90 B |
| 3,631,473 | 12/1971 | Yakata et al. ...................... | 340/365 E |
| 3,735,050 | 5/1973 | Mardas .............................. | 179/90 B |
| 3,787,639 | 1/1974 | Battrick ............................. | 179/90 K |
| 3,856,982 | 12/1974 | Lawson et al. ..................... | 179/90 R |

*Primary Examiner*—Kathleen H. Claffy
*Assistant Examiner*—Gerald L. Brigance
*Attorney, Agent, or Firm*—Karl F. Ross; Herbert Dubno

[57] ABSTRACT

In order to enable the transmission of digital pulses under the control of a pushbutton-type call-number selector from a dial-equipped subscriber station, the output leads of a keyboard are connected on the one hand to a circulating memory, working into a pulse generator, and on the other hand to a timing network which responds to the depression of any pushbutton on the keyboard with emission of an enabling pulse making the memory receptive to the selected code combination. The timing network includes a delay network which briefly retards the enabling pulse to prevent the storage of spurious signals in response to transient energization of an output lead of the keyboard.

10 Claims, 3 Drawing Figures

PUSHBUTTON-CONTROLLED CALL-NUMBER SELECTOR FOR DIAL-EQUIPPED TELEPHONE

1. Field of the Invention

Our present invention relates to a call-number selector of the pushbutton type as used, in lieu of the more conventional dialing disk, to initiate calls from a subscriber station of a telephone or other telecommunication system.

2. Background of the Invention

The transmission of call-number digits from a subscriber station via a line to a central office or exchange, under the control of manually operated switches such as the pushbuttons of a keyboard, can be carried out with the aid of different characteristic frequencies if the exchange is designed to handle signals of this type. In the case of exchanges capable only of processing digital pulse trains from dial-equipped stations, the pushbutton switches must co-operate with a translator in the subscriber station converting the output signals of the keyboard into corresponding pulse trains. Such a translator usually comprises a memory for the temporary storage of the selection signals emitted by the keyboard, advantageously in the form of a binary code, as well as a pulse generator triggered by the stored signals to deliver the requisite pulse trains to the line.

In conventional systems of this nature, the pulse generator includes a relay with contacts inserted in one of the line conductors, the relay being operated by a small local battery which is normally open-circuited by the hook switch controlled by the subscriber's handset and which is recharged, upon closure of the hook switch, by the line voltage from the exchange. If the battery happens to be insufficiently charged upon the initiation of a call, the subscriber may not be able to select a number immediately inasmuch as the line current used for recharging is interrupted with each digital pulse.

Moreover, the digit-storing memory controlling the pulse generator must be cleared upon the initiation of each new call in order to prevent false operation due to the presence of bits from an earlier selection in that memory. Generally, therefore, the hook switch had to be encumbered heretofore with several sets of contacts to carry out these different operations, i.e. to clear the memory and to connect the local battery to the line besides performing its normal function of closing the line loop.

OBJECTS OF THE INVENTION

The general object of our present invention is to provide a simplified call-number selector of the aforedescribed character in which all operations incident in the transmission of the digital pulses are performed by purely electronic means, thereby relieving the hook switch of its ancillary functions.

A related object is to provide a selector of this nature operating without a local battery.

A further object is to provide means in such a selector for delaying the storage of a digital code combination, in response to operation of any pushbutton-actuated switch, for a period sufficient to avoid malfunctions of the pulse generator due to spurious signal voltages.

SUMMARY OF THE INVENTION

In accordance with our present invention, the output leads of a coder controlled by a set of manually operable switches are connected on the one hand to a memory for the storage of digital code combinations, as discussed above, and in parallel therewith to a timing circuit which transmits to the memory an enabling pulse upon the energization of any of these output leads, the memory being normally nonreceptive to a code combination and being rendered temporarily receptive thereto in the presence of the enabling pulse. Upon the operation of any of these switches, the selected output lead or leads are connected across a capacitor which is in series with a line conductor so as to be charged by a d-c source in the exchange upon completion of a signal loop by the closure of the normally open hook switch.

Pursuant to a more particular feature of our invention, the timing circuit includes a delay network which retards the enabling pulse for the purpose of preventing false operation, the delay network being in circuit with a self-blocking transistor which conducts for a limited time at the end of the delay period to generate the enabling pulse. This transistor, whose operation is thus comparable to that of a monostable multivibrator or monoflop, has its input connected to the several output leads of the coder via an OR circuit in series with the delay network. The OR circuit may consist of a set of diodes decoupling the several output leads from one another.

According to a further feature of our invention, the digital pulses are repeated to the transmission line by a first transistor in series with a conductor of that line, a second transistor being connected to this conductor at a junction lying between the first transistor and the handset. This second transistor, which advantageously is of the same conductivity type as the first transistor, serves to short-circuit the handset during dialing as is well known per se.

Still another feature of our invention resides in the provision of a threshold circuit connected to the aforementioned line conductor between the first transistor and the hook switch in order to generate a clearing pulse for the memory upon closure of the hook switch while discriminating against minor fluctuations in line voltage so as to preclude untimely cancellation of the stored bits from the memory. This threshold circuit, as well as other components of the system including the pulse generator, is connected across an energy-storing circuit which includes the aforementioned capacitor inserted between the hook switch and the first transistor and, advantageously, further includes an electronic breakdown device (i.e. a Zener diode) shunting the storage capacitor for limiting its charging voltage.

BRIEF DESCRIPTION OF THE DRAWING

The above and other features of our invention will now be described in detail with reference to the accompanying drawing in which.

SPECIFIC DESCRIPTION

Figure 1:
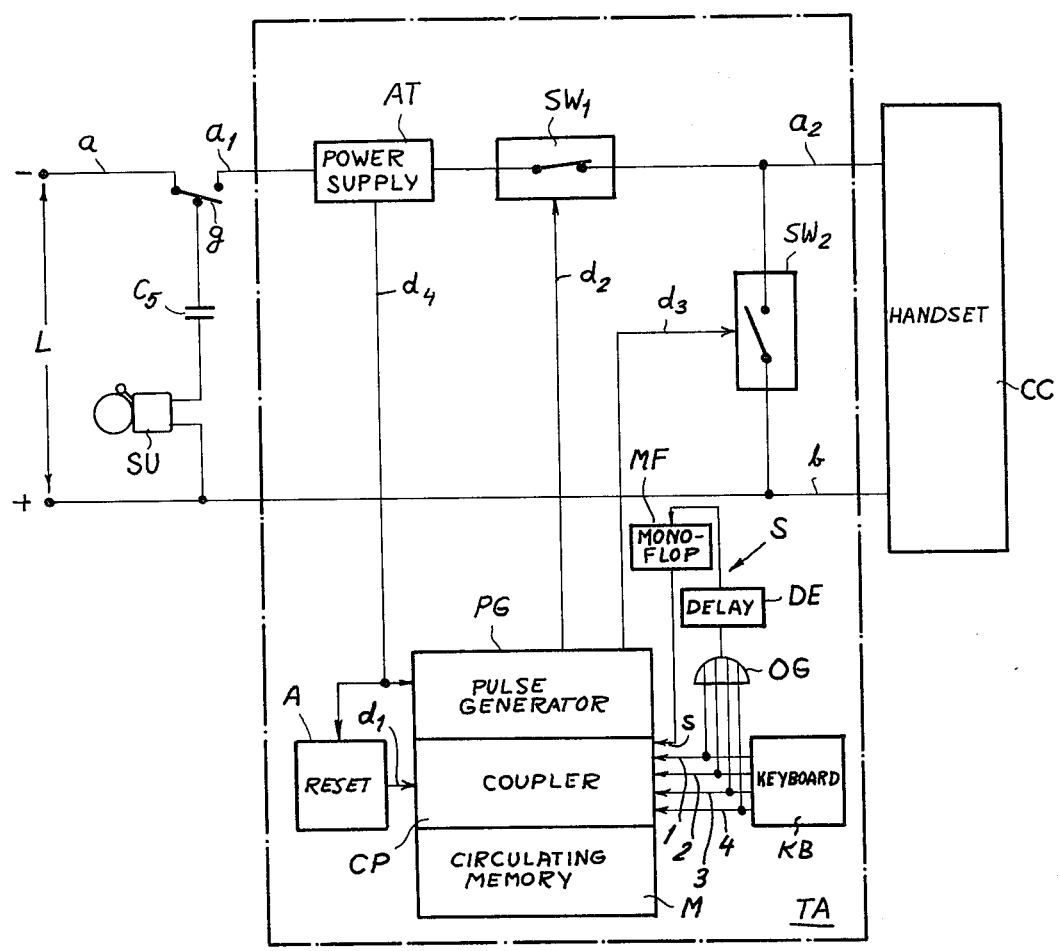
FIG. 1 is an overall block diagram of a call-number selector embodying our invention.

In FIG. 1 we have shown a two-wire line L with conductors $a$ and $b$ extending from a nonillustrated exchange to a subscriber station. This station includes the usual handset CC, with microphone and speaker for the transmission and reception of voice currents, as well as a hook switch $g$ in series with conductor $a$, a ringer SU and a blocking capacitor $C_5$. In its normal position shown in FIGS. 1 and 2, hook switch $g$ disconnects the conductor $a$ from an extension $a_1$ thereof and connects the ringer SU in series with capacitor $C_5$ across the line for actuation in the event of an incoming call.

Conductor extension $a_1$ leads to a power supply AT which is connectable by a first switch $SW_1$ to an input $a_2$ of the handset CC whose other input is permanently connected to conductor $b$. Conductor $a$ is biased negative with reference to conductor $b$ by the line voltage originating at the exchange. A second switch $SW_2$, normally open, lies across the two handset inputs $a_2$ and $b$.

Power supply AT and switches $SW_1$, $SW_2$ form part of a call-number selector TA also comprising a keyboard KB with the usual complement of 10 pushbuttons, not shown, for the individual selection of any digit from 1 through 0. Keyboard KB coacts with a decimal-binary coder CD (FIG. 2) energizing one or more of four output leads 1, 2, 3, 4 upon the depression of any pushbutton. These output leads extend through a coupler CP, or interface circuit, to a memory M of the circulating type adapted to register the bits of any code combination constituting the number of a called subscriber. A pulse generator PG, connected to memory M by way of coupler CP, is programmed to convert the successively stored code combinations into trains of digital pulses which actuate, over a lead $d_2$, the series switch $SW_1$ to open the loop that was closed by hook switch $g$ upon the initiation of a call with the lifting of the handset CC. Pulse generator PG also energizes a lead $d_3$ to close the shunt switch $SW_2$ for the duration of each digital pulse train to short-circuit the voice-current transceiver in the handset.

In accordance with an important feature of our present invention, memory M is normally inhibited from receiving the output of keyboard KB but can be made receptive to that output by a timing circuit S connected to leads 1 – 4 in parallel with coupler CP. As schematically shown in FIG. 1, this timing circuit includes an OR gate OG working through a delay network DE into a monoflop MF, the latter generating a retarded enabling pulse on a lead $s$ extending through coupler CP to memory M for unblocking the writing input of the latter in order to facilitate the inscription of the selected code combination.

A resetting circuit A responds to the initial energization of an output lead $d_4$ of power supply AT by the closing of hook switch $g$ with the generation of a clearing pulse on a lead $d_1$ extending via coupler CP to memory M. The previous contents of memory M are thereby discharged before the subscriber operates the keyboard KB after receiving dial tone from the exchange.

Figure 2:
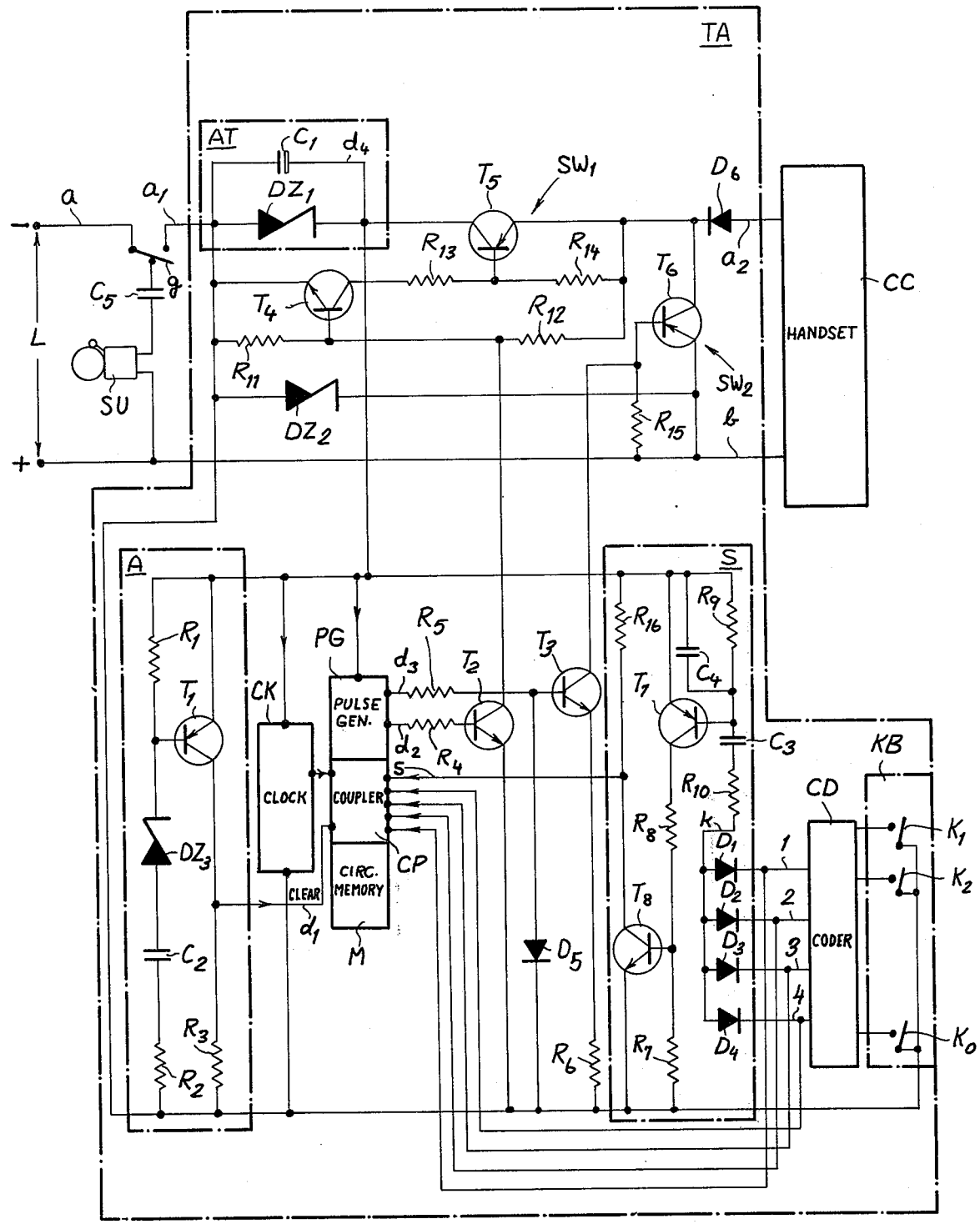
FIG. 2 is a more detailed circuit diagram of the system of FIG. 1.

Reference will now be made to FIG. 2 for a more detailed description of the nonconventional elements of our improved call-number selector TA.

Power supply AT is seen to comprise a Zener diode $DZ_1$ shunted by a capacitor $C_1$, the diode being inserted with reverse polarity in conductor extension $a_1$ so as to oppose the transmission of negative voltage to the collector of a PNP transistor connected to handset input $a_2$ through a diode $D_6$ inserted with forward polarity between input $a_2$ and a junction of conductor $a_1$ with the collector of another PNP transistor $T_6$ forming part of switch $SW_2$. A biasing circuit for the base of transistor $T_5$ extends from that junction to the input end of power supply AT, this biasing circuit including an NPN transistor $T_4$ in series with two resistors $R_{13}$, $R_{14}$ whose junction is tied to the base of transistor $T_5$. Circuit $T_4$, $R_{13}$, $R_{14}$ is bridged by a voltage divider $R_{11}$, $R_{12}$ driving the base of transistor $T_4$ positive with reference to its emitter upon closure of hook switch $g$ so that the base of transistor $T_5$ is negatively biased and this transistor also conducts. Closure of the line loop from conductor $b$ via handset CC, diode $D_6$, transistor $I_5$ and power supply AT to conductor $a$ charges the capacitor $C_1$ to the breakdown voltage of Zener $DZ_1$ whereby a fixed operating voltage V (FIG. 3) is developed between output lead $d_4$ and conductor $a_1$, the latter being also connected to components A, S and KB. This operating voltage V is reached, as illustrated in the bottom graph (labeled $d_4$) of FIG. 3, at an instant $t_1$ following closure of the hook switch at time $t_0$, the voltage rising exponentially from zero in the interval $t_{95\ 0}$– $t_1$. Another Zener diode $DZ_2$, connected between conductors $a_1$ and $b$, stabilizes the voltage across line L. Conductor $b$ is connected directly to the emitter and through a resistor $R_{15}$ to the base of transistor $T_6$ whose collector is tied to the emitter of transistor $T_5$.

Figure 3:
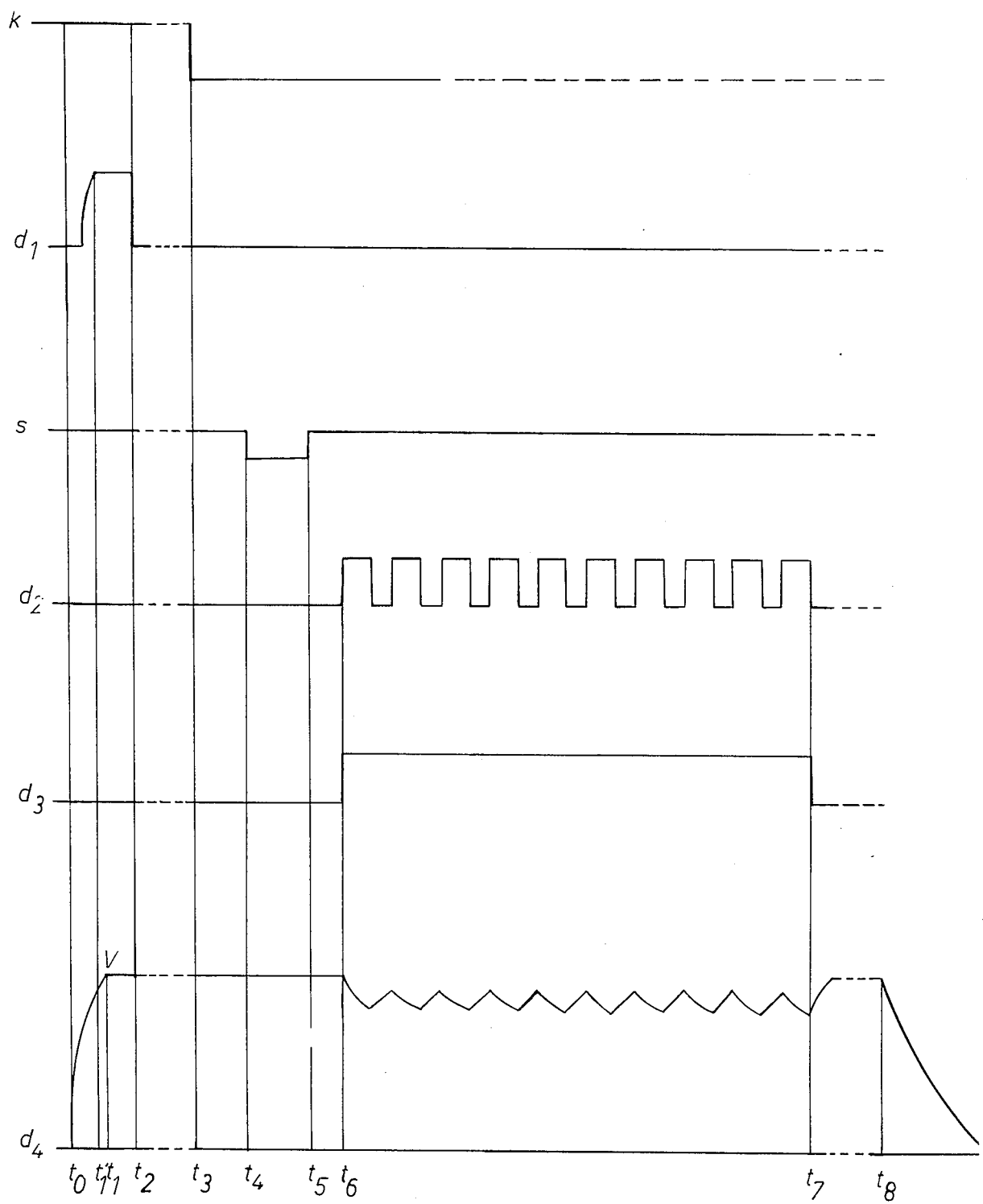
FIG. 3 is a set of graphs relating to the operation of the system.

Resetting circuit A comprises a PNP transistor $T_1$ having its emitter joined directly to lead $d_4$ and having its collector connected to conductor $a_1$ through a resistor $R_3$. The base of transistor $T_1$ is biased by a threshold circuit including, in series, a resistor $R_1$, a Zener diode $DZ_3$, a capacitor $C_2$ and a resistor $R_2$; the two latter impedances constitute a network with a time constant $\pi_1 = R_2 C_2$. As the voltage across this biasing circuit rises above the breakdown threshold of Zener diode $DZ_3$, i.e. at an instant $t_1'$ (FIG. 3), transistor $T_1$ begins to conduct and to generate on lead $d_1$ a clearing pulse as illustrated in FIG. 3 on the graph labeled $d_1$. The duration of this clearing pulse is measured by the time constant $\pi_1$; thus, the charging of capacitor $C_2$ cuts off the transistor $T_1$ at an instant $t_2$ to terminate that pulse. Memory M is now empty but is still inhibited from receiving any bits of a new call number.

Keybord KB is provided with a set of switches $K_1$, $K_2$, ... $K_0$ for the selection of any decimal digit. Coder CD responds to the closure of any one of these switches by applying negative potential from conductor $a_1$ to one or more of its output leads 1 – 4 which are connected via respective diodes $D_1$ – $D_4$ to a lead $k$, these diodes collectively representing the OR gate OG of FIG. 1. Lead $k$ feeds a pair of cascaded time-constant networks, i.e. a resistor $R_{10}$ in series with a capacitor $C_3$ and a resistor $R_9$ in parallel with a capacitor $C_4$. The junction of these two networks is tied to the base of an NPN transistor $T_7$ whose emitter is joined to lead $d_4$ and whose collector is connected to conductor $a_1$ by way of a voltage divider consisting of two resistors $R_7$, $R_8$. A common terminal of these resistors is tied to the base of an NPN transistor $T_8$ having its emitter connected to conductor $a_1$, the collector of this latter transistor being connected through a resistor $R_{16}$ to lead $d_4$ and being also joined to lead $s$ extending to coupler CP.

Initially, with none of the switches $K_1$ – $K_0$ closed, lead $k$ is maintained substantially at the potential of lead $d_4$, i.e. positive with reference to conductor $a_1$. The depression of any pushbutton of keyboard KB at a time $t_3$ drives this lead negative, as shown in graph $k$ of FIG. 3, thus developing a potential difference across the two cascaded time-constant networks $R_{10}$, $C_3$ and $R_9$, $C_4$.

The magnitudes of capacitances $C_3$, $C_4$ and resistances $R_9$, $R_{10}$ are so chosen that condenser $C_4$ charges more quickly than condenser $C_3$, driving transistor $T_7$ into conduction at an instant $t_4$ to saturate the transistor $T_8$ and generate on lead $s$ an enabling pulse for memory M as shown in graph $s$ of FIG. 3. After an interval determined mainly by the time constant $\pi_2 = (R_9 + R_{10}) \cdot C_3$, i.e. at an instant $t_5$, this negative enabling pulse is terminated. During that interval, there are inscribed in memory M the bits carried on leads 1 – 4 which are now circulated through that memory in the rhythm of a source of clock pulses CK connected across leads $d_4$ and $a_1$ so as to become operative only at time $t_1$. These clock pulses also control the pulse generator PG which thereupon emits one or more digital pulses on its output lead $d_2$ as indicated in the correspondingly designated graph of FIG. 3; in this specific instance it has been assumed that switch $K_0$ was closed by the subscriber and that the pattern of energization of leads 1 – 4, corresponding to binary 10, has been stored in memory M in the form of bits triggering the emission of ten consecutive dialing pulses. These pulses, of positive polarity, are fed through a resistor $R_4$ to the base of an NPN transistor $T_2$ whose emitter is tied to conductor $a_1$ and whose collector is joined to the base of transistor $T_4$; each dialing pulse, therefore, cuts off the transistors $T_4$ and $T_5$ of switch $SW_1$ so as to open-circuit the line loop as seen from the exchange. At the same time, as shown in graph $d_3$ of FIG. 3, pulse generator PG also energizes its output lead $d_3$ which is tied through a resistor $R_5$ to the base of an NPN transistor $T_3$ having its emitter connected through a resistor $R_6$ to conductor $a_1$ and having its collector tied to the base of transistor $T_6$. The latter is thereby saturated and short-circuits the handset CC downstream of diode $D_6$. The forward voltage threshold of this diode is higher than the saturation voltage drop of transistor $T_6$ so that the fluctuations in the emitter potential of transistor $T_5$, occurring during dialing, are not transmitted to the earphone of the handset. The base of transistor $T_3$ is connected to conductor $a_1$ via a diode $D_5$.

The recurrence period of the dialing pulses is short enough to cause only a partial discharge of capacitor $C_1$ during cutoff of transistor $T_5$, thereby resulting in a ripple voltage on lead $d_4$ as indicated in FIG. 3.

At the end of the digital pulse train, which lasts from a time $t_6$ to a time $t_7$, the capacitor voltage quickly returns to its operating level V.

When, after the consummation of the call, the hook switch $g$ is opened at a time $t_8$, capacitor $C_1$ discharges exponentially up to a time $t_9$ whereupon the system reverts to its quiescent state.

The threshold circuit including Zener diode $DZ_3$ insures that the ripple voltage caused by the dialing pulses on lead $d_4$ will not reoperate the transistor $T_1$ to clear the memory M prematurely.

We claim:
1. A call-number selector for a subscriber station of a telecommunication system linked with an exchange through a two-conductor transmission line, comprising:
   a normally open hook switch in a conductor of said line closable upon the initiation of an outgoing call to complete a signal loop to the exchange;
   an energy-storing circuit in said signal loop including a capacitor connected in series with said conductor for charging from a d-c source in the exchange upon closure of said hook switch;
   a set of manually operable switches for the selection of respective call-number digits;
   coding means provided with a plurality of output leads selectively connectable across said capacitor for energization by the charge thereof upon the operation of any of said switches;
   memory means connected to said output leads for storing a code combination of a selected digit, said memory means being normally nonreceptive to said code combination;
   pulse-generating means energizable by the charge on said capacitor and responsive to the contents of said memory means for emitting a series of dial pulses corresponding to the value of the selected digit;
   timing means energizable by the charge on said capacitor and connected to said output leads in parallel with said memory means for transmitting to said memory means an enabling pulse in response to energization of any of said output leads, thereby making said memory means responsive to said code combination;
   clearing means connected across said capacitor and responsive to the charging thereof for emitting a signal canceling the stored code from said memory means; and
   pulse-repeating means in said transmission line connected to said pulse-generating means for actuation thereby with open-circuiting of said signal loop in response to each dial pulse for a period insufficient to discharge said capacitor.

2. A selector as defined in claim 1 wherein said timing means includes delay means for retarding said enabling pulse for a predetermined period upon energization of any of said output leads.

3. A selector as defined in claim 2 wherin said timing means further includes self-blocking transistor means in circuit with said delay means for triggering thereby.

4. A selector as defined in claim 3 wherein said delay means comprises two cascaded time-constant networks having a junction point connected to an input of said transistor means.

5. A selector as defined in claim 2 wherein said timing means further includes an OR circuit extending from said output leads to said delay means.

6. A selector as defined in claim 1 wherein said pulse-repeating means comprises a first transistor in series with said conductor and a second transistor connected across said line for short-circuiting same during generation of said dial pulses, said station being provided with voice-transceiving equipment connected across said line in series with said first transistor, said second transistor being connected to said conductor at a junction disposed between said equipment and said first transistor.

7. A selector as defined in claim 6 wherein said first and second transistors are of like conductivity type, further comprising a diode inserted in said conductor between said equipment and said junction with a polarity corresponding to that of said first transistor, said diode having a forward voltage threshold higher than the saturation voltage drop of said second transistor.

8. A selector as defined in claim 6 wherein said hook switch is inserted between said first transistor and the exchange, said clearing means comprising a threshold circuit including a time-constant network connected to said conductor for generating a clearing pulse for said memory means upon closure of said hook switch.

9. A selector as defined in claim 8 wherein said threshold circuit includes a Zener diode in series with said time-constant network.

10. A selector as defined in claim 1 wherein said energy-storing circuit further includes an electronic breakdown device shunting said capacitor for limiting the charging voltage thereof.

* * * * *